(12) United States Patent
Pessina et al.

(10) Patent No.: US 6,378,690 B1
(45) Date of Patent: Apr. 30, 2002

(54) APPARATUS FOR CONVEYING AND ROTATING BOOK PACKS, PAMPHLET BUNDLES AND THE LIKE

(75) Inventors: Giorgio Pessina, Cusano Milanino; Aldo Perobelli, Paderno Dugnano, both of (IT)

(73) Assignee: O.M.G. di G. Pessina e A. Perobelli S.n.c., Milan (IT)

(*) Notice: Subject to any disclaimer, the term of this patent is extended or adjusted under 35 U.S.C. 154(b) by 0 days.

(21) Appl. No.: 09/577,253

(22) Filed: May 19, 2000

(30) Foreign Application Priority Data

May 25, 1999 (IT) .......................... MI99A1140

(51) Int. Cl.$^7$ .............................................. B65G 29/00
(52) U.S. Cl. .................. 198/414; 198/409; 198/411
(58) Field of Search ................. 198/414, 413, 198/375, 409, 411

(56) References Cited

U.S. PATENT DOCUMENTS

| | | | | |
|---|---|---|---|---|
| 3,675,789 A | * | 7/1972 | Sturdy | 214/1 QG |
| 4,368,815 A | * | 1/1983 | Kvasnicka | 198/413 |
| 4,387,890 A | * | 6/1983 | Lampe | 271/225 |
| 4,606,452 A | * | 8/1986 | Lecrone | 198/411 |
| 4,763,778 A | * | 8/1988 | Feddersen et al. | 198/803.01 |
| 4,938,334 A | * | 7/1990 | McGinn | 198/346.1 |
| 5,000,305 A | * | 3/1991 | Lucas | 198/414 |
| 5,009,306 A | * | 4/1991 | Roderick et al. | 198/414 |
| 5,064,051 A | * | 11/1991 | Blundy | 198/466.1 |
| 5,069,598 A | * | 12/1991 | Kleinhen et al. | 414/790 |
| 5,090,554 A | * | 2/1992 | De Sanctis | 198/414 |
| 5,143,198 A | * | 9/1992 | Hale et al. | 198/414 |
| 5,172,801 A | * | 12/1992 | Georgitsis et al. | 198/414 |
| 5,293,984 A | * | 3/1994 | Lucas | 198/414 |
| 6,086,318 A | * | 7/2000 | Bogendorfer | 414/783 |
| 6,234,299 B1 | * | 5/2001 | Voorhees et al. | 198/413 |

FOREIGN PATENT DOCUMENTS

| | | |
|---|---|---|
| CH | 394014 | 11/1965 |
| DE | 2718983 | 11/1977 |
| DE | 8706809 | 7/1987 |
| DE | 3907566 | 8/1990 |
| DE | 19701345 | 7/1998 |

* cited by examiner

Primary Examiner—Christopher P. Ellis
Assistant Examiner—Rashmi Sharma
(74) Attorney, Agent, or Firm—Biebel & French

(57) ABSTRACT

An apparatus for conveying and rotating book packs (11), pamphlet bundles and the like upon deposition onto a conveyor belt (7) for stacking the packs (11) onto a pallet or a stacking plane, comprising a device (A) for grasping and rotating the pack (11) and an articulated device with chain (6) for advancing (B) the device (A).

7 Claims, 5 Drawing Sheets

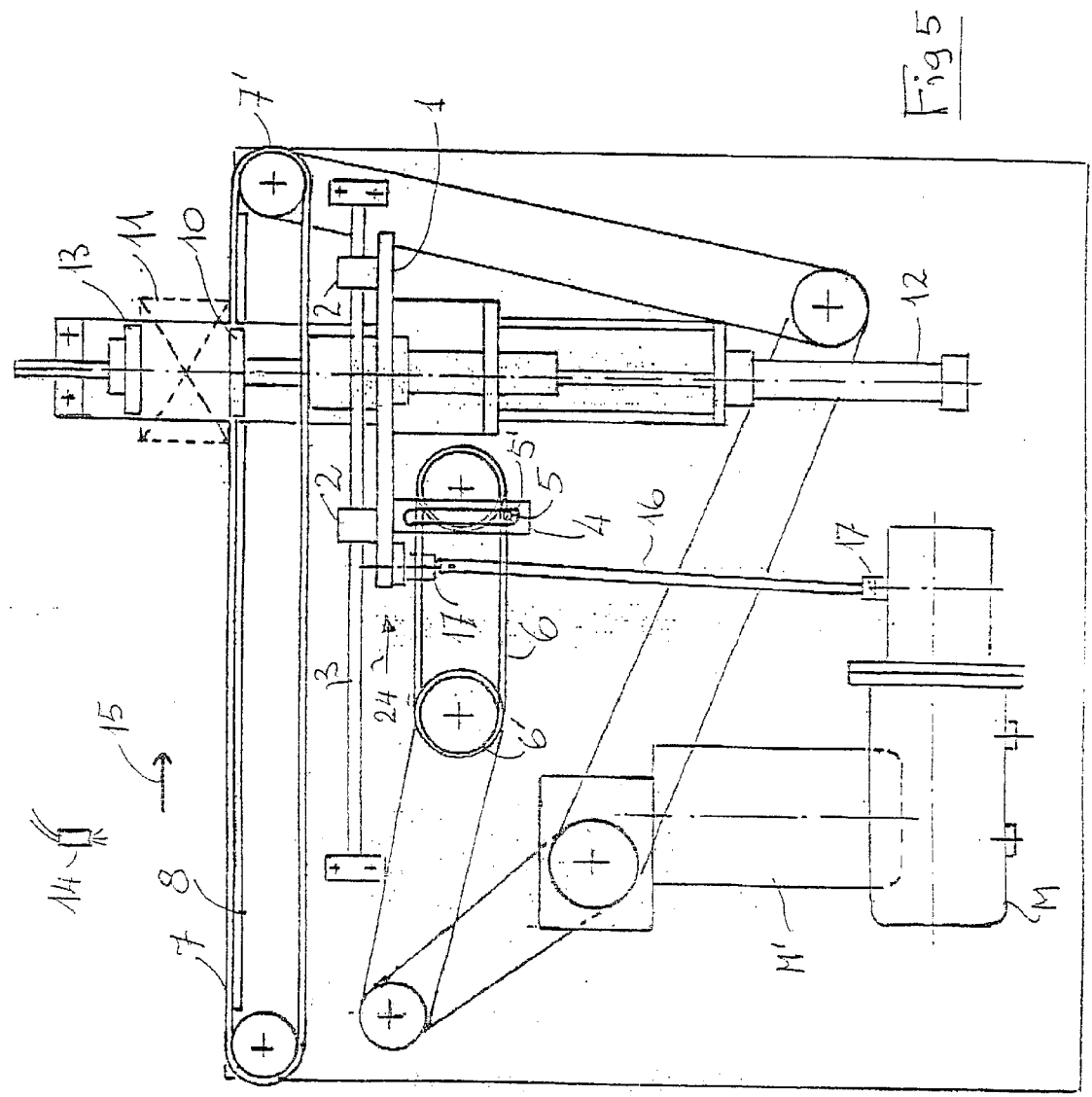

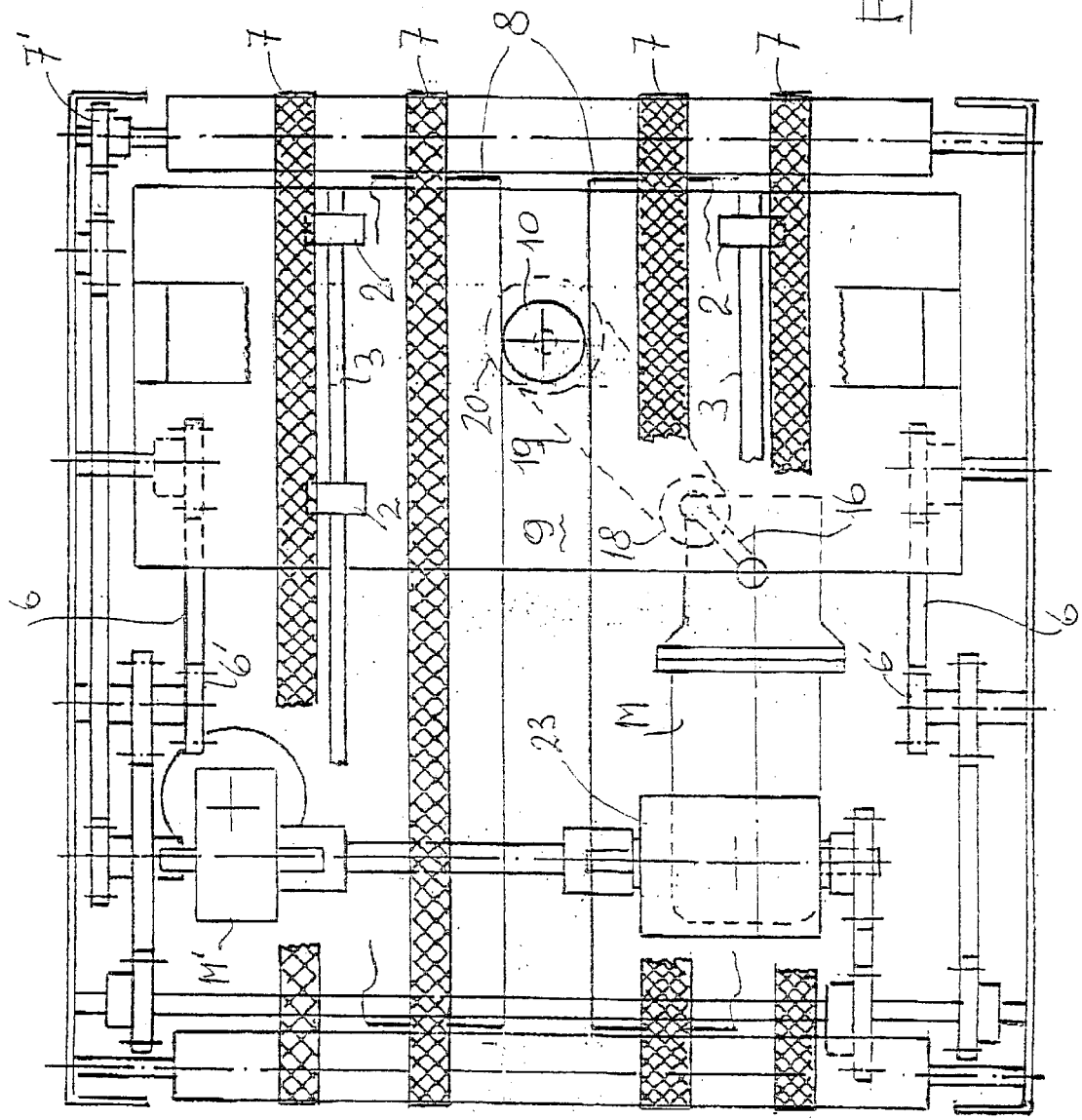

APPARATUS FOR CONVEYING AND ROTATING BOOK PACKS, PAMPHLET BUNDLES AND THE LIKE

BACKGROUND AND SUMMARY OF THE INVENTION

The present invention relates to an apparatus for conveying and rotating wrapped or non wrapped book packs, pamphlet bundles and the like on a conveyor belt for stacking the same on a pallet or on a stacking plane in order to form individual stable stacks, said apparatus comprising a device for grasping and rotating the pack and an advancing device.

It is known that, in order to possibly palletise book packs, pamphlet bundles and the like, it is necessary to rotate one or several lines of packs forming the layers of the pallet so that the layers are tied together to a stable pack stack.

The same problems occurs in stacking devices in which packs the thickness of which is not uniform are stacked, thereby requiring to be alternately rotated by 90° or 180° in order to obtain a stable stack.

In the known systems, the carriage that carries the pack-rotating device in its linear translation movement is driven by a connecting rod-crank mechanism that gives rise to a harmonic motion. For this reason, the pack advancement and deposition onto a conveyor belt are performed at a different speed than that of the conveyor belt, which causes the stacks of non-wrapped book or pamphlets to be disarranged and the stability of the stacks to be impaired.

It is also known that, in order to obtain the carriage translation movement, in certain cases an arrangement is used that allows the carriage to be directly displaced in a reciprocating manner, with the disadvantage that the starting and stopping actions are abrupt and the implementation costs are high, complicated control devices being required for the proper adaptation to the various working speeds.

The apparatus of the present invention aims in particular at obtaining, in a simple way, zero relative speed between the pack grasping and rotating device and the conveyor belt onto which the packs are laid, that is, having an advancement speed of said device that is the same as the speed of said conveyor belt.

BRIEF DESCRIPTION OF THE DRAWINGS

The description hereinafter provided as a mere, non-limiting example refers to the accompanying drawing, in which:

FIGS. 1, 2, 3, 4 represent the elevation views of the apparatus in its various positions during the grasping, rotation, advancement and deposition cycle for a book pack, a pamphlet bundle or the like;

FIG. 5 represents the elevation view of the apparatus in its final advancement step, with kinematic links for actuating the conveyor belt and advancing the pack grasping and rotating device;

FIG. 6 represents a plan view on the apparatus; and

DETAILED DESCRIPTION OF THE PREFERRED EMBODIMENT

Figure 1:
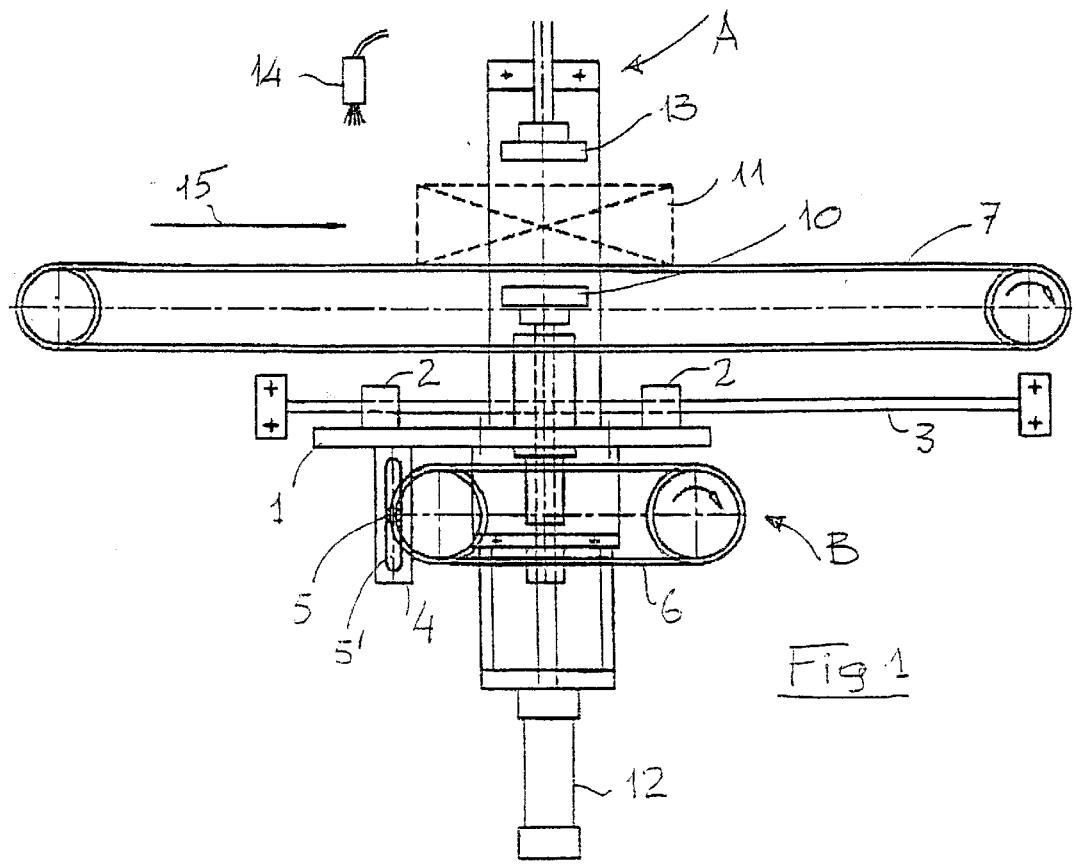
Figure 2:
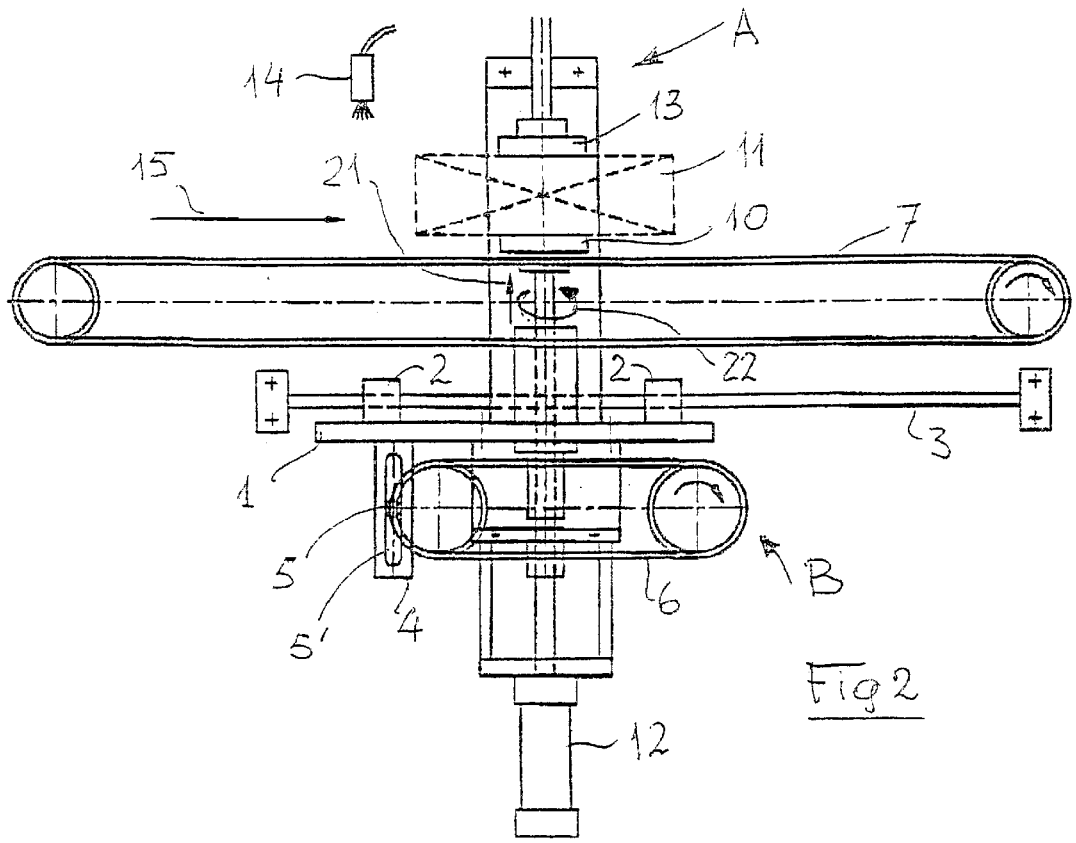
Figure 4:
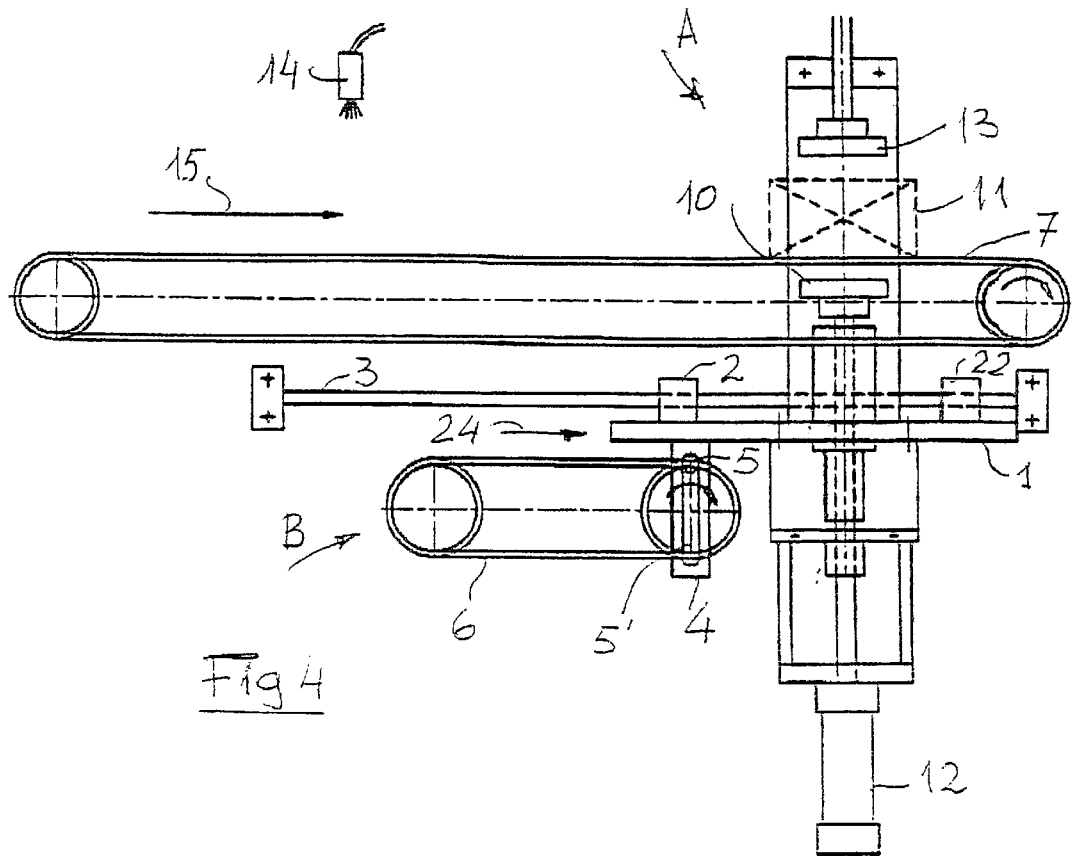
Figure 3:
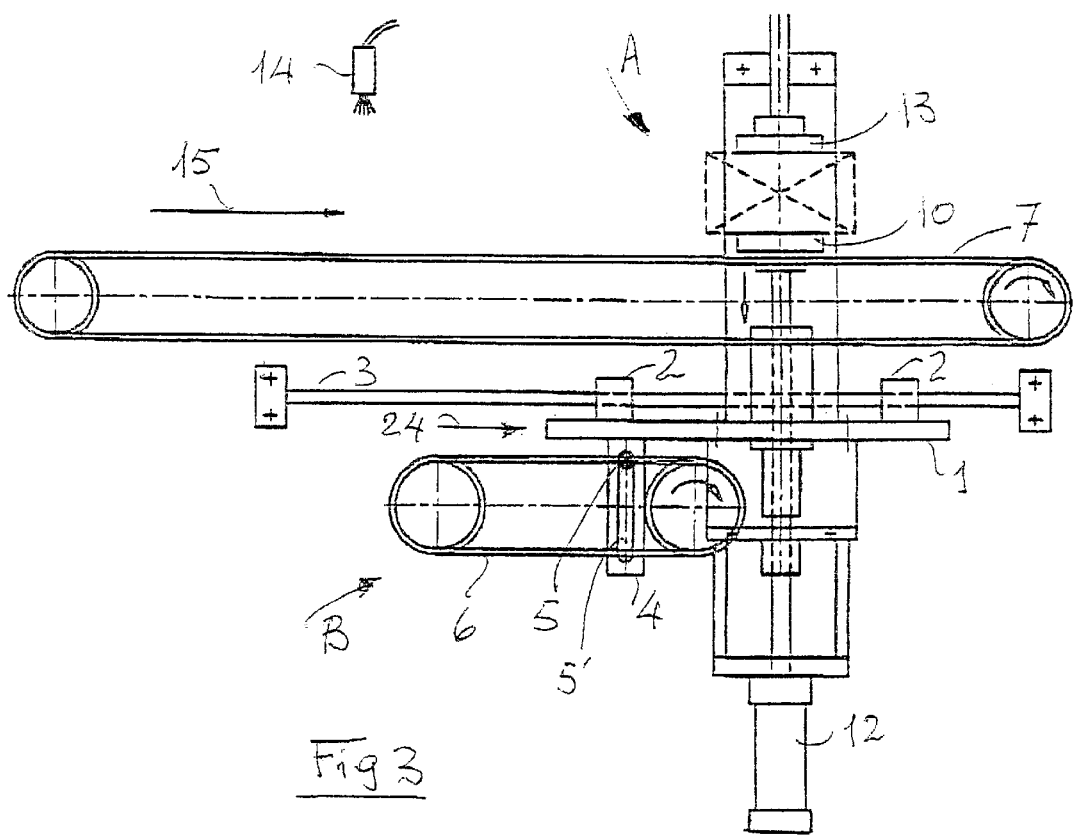

As can be seen from FIGS. 1 to 6, the apparatus comprises a movable plate 1 that is solidly connected to supports 2, said supports sliding on a rail 3, and members 4 that are solidly connected to the plate 1, said members 4 having a groove 5' within which there is slidingly received a pin 5 that is solidly connected to each of the closed-loop chains 6, said chains 6 forming an articulated joint.

The speed of the chains 6 is the same as the speed of the conveyor belt (or belts) 7 forming the pack conveying mat because, as can be seen from FIG. 5, the kinematic links connecting a motor-reducing unit M' to the pulley 6' of chain 6 and the pulley 7' of conveyor belt 7 has a 1:1 ratio.

Two half planes 8 that are fixed below said conveying mat have a slot 9 that is suited to allow a support and rotation dish for the book pack or pamphlet bundle 11 to pass therethrough. The pack or bundle is grasped by lifting the lower dish 10 by means of piston 12, said dish 10 lifting the pack or bundle 11 from the conveyor belts 7 and pressing them against the upper dish 13.

Lifting of the pack or bundle is achieved through the command provided by a sensor 14 when the pack or bundle 11 begins passing on the conveyors 7 with the displacement direction shown by arrow 15. The rotation of the pack or bundle 11 is provided by the motor-reducing unit M cooperating with a shaft 16, which is provided with cardan joints 17 and drives the toothed pulley 18. The latter, though belt 19, drives pulley 20 that is solidly connected to the dish 10 for grasping and rotating the pack or bundle, thereby causing the pack or bundle 11 to be rotated through 90° or 180°, as required by the process.

The movement of chains 6 that drive the plate 1, said plate supporting the device for grasping and rotating the pack or bundle, is started up sequentially by sensor 14 that causes a brake-clutch arrangement 23 to be actuated, to which the kinematic links driving the chains 6 are connected through the motor-reducing unit M'.

The latter is directly connected to the conveyor belts 7. After that the chains 6 have caused the plate 1 to perform a complete back-and-forth run with the accompanying rotation of the pack or bundle 11 and its deposition onto the conveyor belts 7, the chains 6 are stopped by means of the brake-clutch arrangement 23 when the plate 1 is in a backwards position, as can be seen from FIG. 1.

At this point the cycle can be started up again, with the various steps that are carried out in the sole forward stroke in the direction of arrow 15.

In the various Figures, with A there is shown the device for grasping and rotating the pack device for grasping and rotating the pack 11, and with B there is shown the advancing device for device A. Sensor 14 determines the whole sequence of the cycle for the grasping, rotation, advancement and deposition of the pack or bundle onto the conveyor belts 7, as hereinafter described.

The pack or bundle 11, while moving in the direction of arrow 15, is intercepted by sensor 14 which, when the pack or bundle is at the centre of the upper dish 13, operates piston 12 that, through the lower dish 10, by moving according to arrow 21, jams and lifts the pack or bundle 11 from the conveyor belts 7 against dish 13. At this point the rotation of the pack or bundle 11 is started, as shown by the arrow 22 (FIG. 2), said rotation being operated through the abovementioned mechanisms, said mechanisms being connected to the motor reducing unit M. Simultaneously with the rotation of the pack or bundle, the plate 1, that is connected to chain 6 by means of the pin 5, is moved in the direction of arrow 15, as driven by the brake-clutch device 23, the pack or bundle being advanced (FIG. 3) at zero relative speed with reference to the speed of the conveyor belts 7 onto which the pack or bundle 11 is deposited without being disarranged. The completion of the operations for the deposition of pack or bundle 11 onto the conveyor belts 7 occurs before the plate 1 reaches the position of FIG. 4.

Plate 1, after that the pack or bundle 11 has been deposited, continues its stroke in the opposite direction until it is located in cycle beginning position shown in FIG. 1 over chains 6.

It is important to note that the handling operations on the pack or bundle 11 are carried out with plate 1 engaged with the straight length of chain 6 that moves in the direction of arrow 24.

Figure 7:
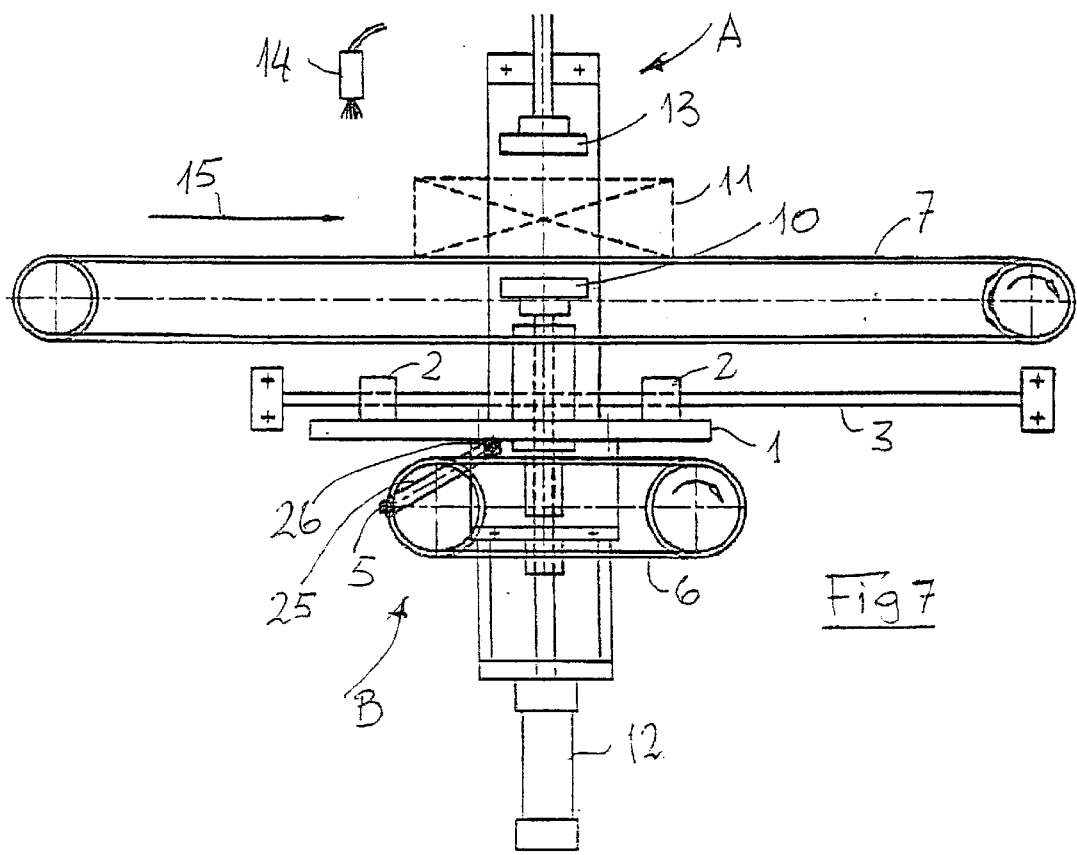
FIGS. 7 and 8 represent a variant of the pack advancing arrangement, in the initial and final advancement steps, respectively.
Figure 8:
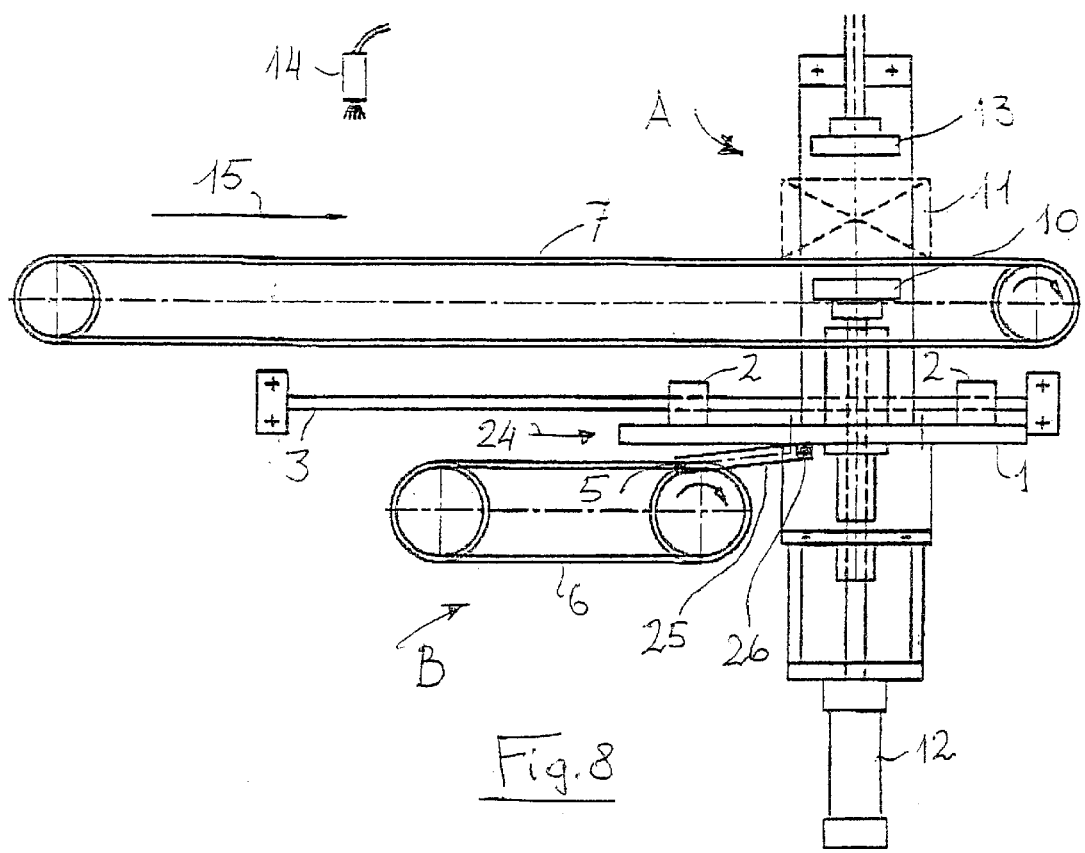

As a variant of the advancement device, there is shown in FIGS. 7 and 8 the articulated joint consisting of a lever 25 that at one end is connected to pin 5 that is fixedly attached to a branch of chain 6 and at the other end is connected with a pin 26 that is carried by plate 1.

The present invention, besides offering a very simple solution, has the advantage of providing a high working speed because the pack or bundle is rotated and advanced at the same time, whilst the apparatuses of the prior art require that the pack or bundle is stopped in order to be rotated and subsequently advanced, with a longer duration of working cycle as compared with the present apparatus.

The present invention is not simply limited to the description above, which is provided as a mere example, but can be modified from a practical manufacturing point of view while remaining within the scope of the present invention, as defined in the appended claims.

What is claimed is:

1. An apparatus for conveying and rotating book packs (11), pamphlet bundles upon deposition onto a conveyor belt (7) for stacking the packs (11) onto a pallet or a stacking plane, comprising a device (A) for grasping and rotating the pack (11) and an advancing device (B) for device (A), the apparatus comprising:
   a) at least a closed-loop chain (6) that constitutes the advancing device (B) with motion parallel to that of conveyor belt (7),
   b) an articulation device that connects said chain (6) to said plate (1), said plate (1) supporting the grasping and rotating device (A) for the pack or bundle (11), and
   c) a motor (M') that drives said conveyor belt (7) and said chain (6) at the same speed characterized in that said grasping and rotating device (A) comprises a lower dish (10) that is suited to be lifted to press the pack or bundle (11) against an upper dish (13) and to be rotated.

2. The apparatus as claimed in claim 1 characterized in that said articulation device comprises a pin (5), said pin being fixedly attached to a branch of chain (6), being apt to move along a member (4) that is fixedly attached to plate (1), and said pin (5) being slidingly received in a groove (5') of said member (4), said groove (5') being perpendicular to the plate (1).

3. The apparatus as claimed in claim 1, characterized in that said articulation device comprises a lever (25) having one end connected to a pin (5) that is fixedly attached to a branch of chain (6) and having the other end connected with a pin (26) that is carried by said plate (1).

4. The apparatus as claimed in claim 1, characterized in that a motor (M) is connected with said lower dish (10) by means of a rotary shaft (16).

5. The apparatus as claimed in claim 4, characterized in that said rotary shaft provided with cardan joints (17), is connect with a pulley (20), said pulley (20) being suited to rotate said lower dish (10).

6. The apparatus as claimed in claim 4, characterized in that it comprises a sensor (14) that detects the presence of the pack or bundle (11), thereby causing said devices to be sequentially actuated by means of the motors (M) and (M'), which determine the operating cycle of the apparatus, said cycle comprising the grasping and rotating of the pack or bundle, the advancement stroke with deposition of the pack or bundle and the return stroke of said device (A) to the backward position corresponding with device (B).

7. The apparatus as claimed in claim 4, characterized in that said motor (M') is directly connected with the conveyor belt (7), while it is connected with chain (6) through a brake-clutch arrangement (23).

\* \* \* \* \*

UNITED STATES PATENT AND TRADEMARK OFFICE
CERTIFICATE OF CORRECTION

PATENT NO. : 6,378,690 B1  Page 1 of 1
DATED : April 30, 2002
INVENTOR(S) : Pessina et al.

It is certified that error appears in the above-identified patent and that said Letters Patent is hereby corrected as shown below:

<u>Title page,</u>
Item [73] please delete "Milan" and insert -- Milano --.

<u>Column 4,</u>
Line 37, please delete "4" and insert -- 1 --.

Signed and Sealed this

Eighteenth Day of June, 2002

Attest:

JAMES E. ROGAN
Attesting Officer   Director of the United States Patent and Trademark Office